US012069177B2

(12) United States Patent
Bales et al.

(10) Patent No.: US 12,069,177 B2
(45) Date of Patent: *Aug. 20, 2024

(54) MULTI-LEVEL ACCESS DISTRIBUTED LEDGER SYSTEM

(71) Applicant: T-Mobile Innovations LLC, Overland Park, KS (US)

(72) Inventors: Mark R. Bales, Lee's Summit, MO (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,708

(22) Filed: Sep. 29, 2023

(65) Prior Publication Data

US 2024/0031157 A1 Jan. 25, 2024

Related U.S. Application Data

(63) Continuation of application No. 17/358,632, filed on Jun. 25, 2021, now Pat. No. 11,818,267.

(51) Int. Cl.
*H04L 29/06* (2006.01)
*G06F 16/955* (2019.01)
(Continued)

(52) U.S. Cl.
CPC .......... *H04L 9/3213* (2013.01); *G06F 16/955* (2019.01); *H04L 9/3236* (2013.01);
(Continued)

(58) Field of Classification Search
CPC . H04L 9/3213; H04L 9/3236; H04L 67/1095; H04L 67/1097; H04L 9/50; H04L 2209/56; G06F 16/955
See application file for complete search history.

(56) References Cited

U.S. PATENT DOCUMENTS 10,068,228 B1 * 9/2018 Winklevoss ........... G06Q 20/34
10,997,251 B2 * 5/2021 Tran ....................... G06Q 50/14
(Continued)

OTHER PUBLICATIONS

Notice of Allowance dated Sep. 1, 2023 U.S. Appl. No. 17/358,632, filed Jun. 25, 2021.

*Primary Examiner* — Mahfuzur Rahman

(57) ABSTRACT

A method of providing read access to information stored in a distributed ledger. The method comprises building a distributed ledger comprising a plurality of blocks each comprising a data content, building a mirrored data store comprising a copy of the data, receiving a request for information by an authenticator application executing on a computer, authenticating a requestor by the authenticator application, determining an access privilege level of the requestor by the authenticator application, determining by the authenticator application that the access privilege level of the requestor is sufficient to authorize access to the information, reading the information from the mirrored data store by the authenticator application, returning the information by the authenticator application to the requestor, and building a transaction record by the authenticator application, wherein the transaction record comprises information about the authenticating, about the authorizing, and about the reading from the mirrored data store.

20 Claims, 5 Drawing Sheets

(51) Int. Cl.
  *H04L 9/32* (2006.01)
  *H04L 67/1095* (2022.01)
  *H04L 67/1097* (2022.01)
  *H04L 9/00* (2022.01)

(52) U.S. Cl.
  CPC ...... *H04L 67/1095* (2013.01); *H04L 67/1097* (2013.01); *H04L 9/50* (2022.05); *H04L 2209/56* (2013.01)

(56) References Cited

U.S. PATENT DOCUMENTS

| | | | |
|---|---|---|---|
| 11,270,295 B2* | 3/2022 | Saraniecki | G06Q 20/401 |
| 11,429,958 B1* | 8/2022 | Michaelis | G06Q 20/4014 |
| 11,431,561 B2* | 8/2022 | Smith | H04L 67/1046 |
| 11,818,267 B1 | 11/2023 | Bales et al. | |
| 2019/0251281 A1* | 8/2019 | Freedman | G06F 21/10 |
| 2019/0312734 A1* | 10/2019 | Wentz | H04L 9/0877 |
| 2020/0244652 A1* | 7/2020 | Iyer | H04L 9/3247 |
| 2021/0036854 A1* | 2/2021 | Dunjic | H04L 9/3213 |
| 2021/0075791 A1* | 3/2021 | Dunjic | H04L 63/0807 |
| 2021/0119764 A1* | 4/2021 | Meghji | H04L 9/3239 |
| 2021/0132826 A1* | 5/2021 | Kwok | G06F 3/0632 |
| 2021/0350887 A1* | 11/2021 | DeRosa-Grund | G06Q 20/02 |
| 2022/0012731 A1* | 1/2022 | DeRosa-Grund | G06F 16/2365 |
| 2022/0021728 A1* | 1/2022 | Kelly | H04L 67/06 |
| 2022/0270725 A1* | 8/2022 | DeRosa-Grund | H04L 67/104 |
| 2022/0318233 A1* | 10/2022 | Martinez | H04L 9/50 |

\* cited by examiner

MULTI-LEVEL ACCESS DISTRIBUTED LEDGER SYSTEM

CROSS-REFERENCE TO RELATED APPLICATIONS

This application is a continuation of and claims priority under 35 U.S.C. § 120 to U.S. patent application Ser. No. 17/358,632 filed on Jun. 25, 2021, entitled "Multi-level Access Distributed Ledger System" by Mark R. Bales, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data is generated by many computerized systems involved in modern life. The data may desirably be stored, secured from tampering, maintained confidential in some cases, and made conveniently accessible. Thus, the management of the automatically generated data becomes itself a task for computer automation.

SUMMARY

In an embodiment, a distributed ledger data store system that separates writing to the distributed ledger from reading the data stored in the distributed ledger is disclosed. The system comprises a distributed ledger comprising a plurality of blocks ordered in a sequence, wherein each block after the first block comprises a hash of the previous block, a nonce value, a data content of the block, and a hash over the hash of the previous block, the nonce value, and the data content, a mirrored data store comprising a copy of the data in the data contents of the blocks of the distributed ledger, a transaction data store comprising records of access transactions, an authenticator application stored in a non-transitory memory, and a data store reader application stored in a non-transitory memory. When executed by a computer, the authenticator application receives a request for information stored in the mirrored data store, wherein the request comprises an identity of a requester, authenticates the identity of the requester, in response to authenticating the requester, generates an access token, stores the access token in an access token data store, returns the access token and a universal resource locator (URL) associated to the mirrored data store to the requester, and stores a record of the authentication of the requestor in the transaction data store. When executed by a computer, the data store reader application receives a request to read data from the mirrored data store from the requester, wherein the request comprises an access token and an identification of data to be read, determines that the access token matches an access token stored in the access token data store, reads data identified by the request to read data from the mirrored data store, returns the data read from the mirrored data store to the requester, and stores a record of the fulfilled read request in the transaction data store.

In another embodiment, a method of providing read access to information stored in a distributed ledger is disclosed. The method comprises building a distributed ledger comprising a plurality of blocks ordered in a sequence, wherein each block after the first block comprises a hash of the previous block, a nonce value, a data content of the block, and a hash over the hash of the previous block, the nonce value, and the data content, building a mirrored data store comprising a copy of the data in the data contents of the blocks of the distributed ledger, receiving a request for information by an authenticator application executing on a computer, wherein the request for information identifies the requestor and an information, and authenticating the requestor by the authenticator application. The method further comprises determining an access privilege level of the requester by the authenticator application, determining by the authenticator application that the access privilege level of the requestor is sufficient to authorize access to the information, and reading the information from the mirrored data store by the authenticator application. The method further comprises returning the information by the authenticator application to the requestor, building a transaction record by the authenticator application, wherein the transaction record comprises information about the authenticating, information about the determining the sufficiency of the access privilege level of the requestor, and information about the reading of the information from the mirrored data store, and storing the transaction record by the authenticator application in a transaction data store.

In yet another embodiment, a distributed ledger data store system that separates writing to the distributed ledger from reading the data stored in the distributed ledger is disclosed. The system comprises a distributed ledger comprising a plurality of blocks ordered in a sequence, wherein each block after the first block comprises a hash of the previous block, a nonce value, a data content of the block, and a hash over the hash of the previous block, the nonce value, and the data content, a mirrored data store comprising a copy of the data in the data contents of the blocks of the distributed ledger, wherein the mirrored data store is partitioned into a plurality of data partitions, and a plurality of transaction data stores comprising records of access transactions, each one of the transaction data stores storing records of access transactions associated with a corresponding one of the data partitions. The system further comprises an authenticator application stored in a non-transitory memory that, when executed by a computer, receives a request for information stored in the mirrored data store, wherein the request comprises an identity of a requester, authenticates the identity of the requester, identifies a universal resource locator (URL) associated with one of the data partitions of the mirrored data store where the requested information is stored, returns the universal resource locator (URL) associated to the mirrored data store to the requester, and stores a record of the authentication of the requestor in the transaction data store associated with the data partition where the requested information is stored. The system further comprises a data store reader application stored in a non-transitory memory that, when executed by a computer receives a request from the requestor to read the information from the data portion where the requested information is stored, reads data identified by the request to read the information from the data partition where the requested information is stored, returns the information read from the data partition where the requested information is stored to the requestor, and stores a record of the fulfilled read request in the transaction data store associated with the data partition where the requested information is stored.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
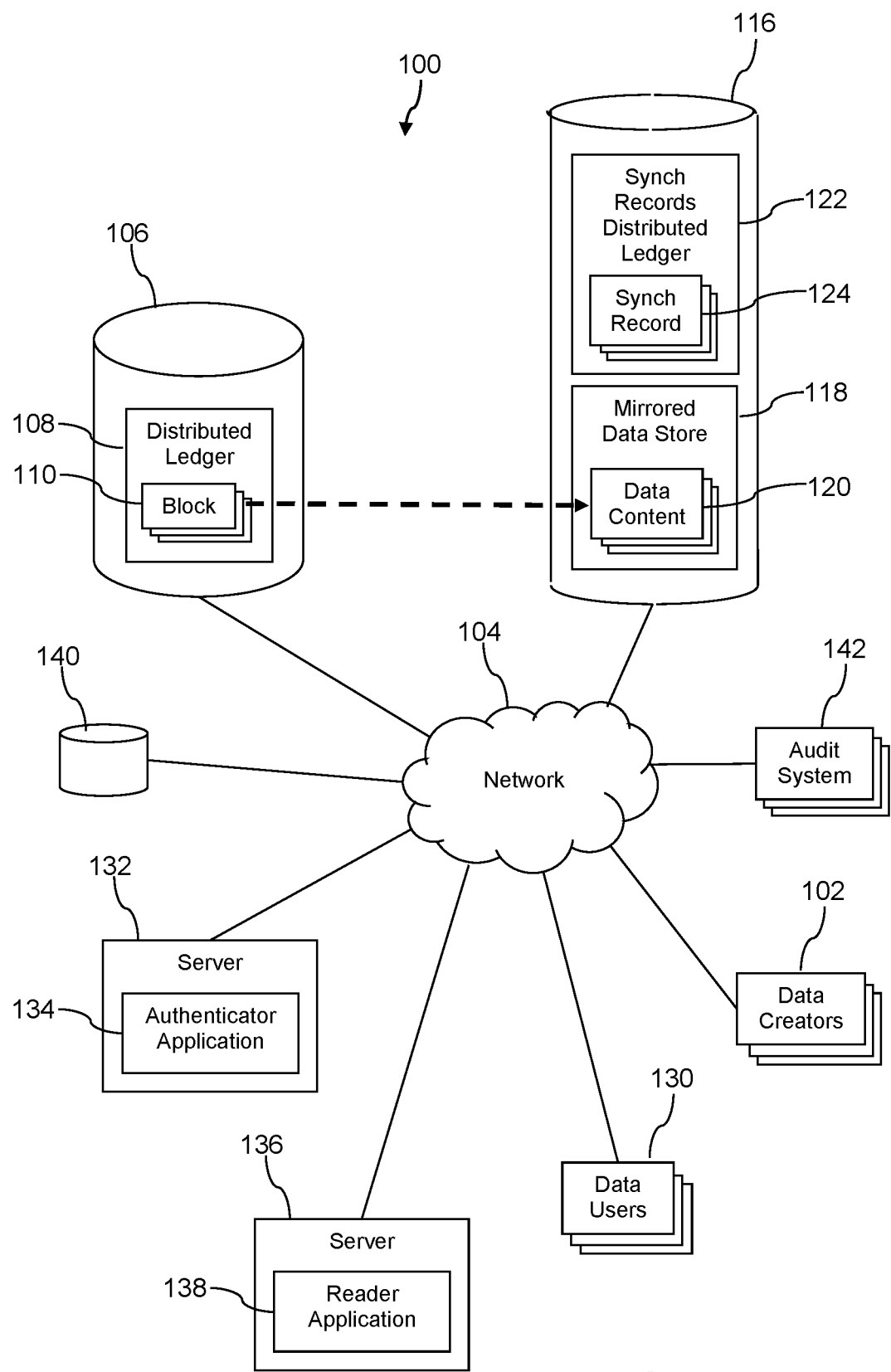
FIG. 1A is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Distributed ledgers comprise an ordered sequence of linked blocks. The initial block may be referred to as a genesis block or a start block. Subsequent blocks all have the same format comprising a hash over the previous block, a nonce value, a data content, and a hash determined over the hash of the previous block the nonce value, and the data content. A distributed ledger may be similar to a block chain but differs in that heavy consensus seeking is not mandated. A bottle neck—or traffic jam situation—can develop when too many attempts to add new blocks to the distributed ledger occur at the same time that too many attempts to read content from the blocks of the distributed ledger occur. Said in other words, attempts to extend the distributed ledger with additional data content by adding new blocks may starve-out attempts to access and read the data stored on the distributed ledger; or attempts to access and read the data stored on the distributed ledger may starve-out attempts to extend the distributed ledger. The present disclosure teaches systems and methods of managing access to the data stored by the distributed ledger whereby to mitigate the risks of such a bottle neck occurring while at the same time supporting the auditing of the data content stored as well as recording and auditing the interactions with the distributed ledger.

As taught herein, the content of the distributed ledger will be mirrored in an independent data store. Requests to access the data captured in the distributed ledger will be directed to the mirrored data store, thereby avoiding accesses starving the processes of extending the distributed ledger. A separate transaction distributed ledger will be established that will record accesses to the mirrored data store (hence, recording proxied accesses to the distributed ledger). An authenticator application will receive queries directed to the distributed ledger and will qualify the requestor and the requestor's query. This can involve authentication of the requestor and authorizing the type of access requested against the privileges of record granted to the requestor. The authenticator application—on approving the query—determines where the query ought to be directed to (e.g., a URL or address of a data store) and returns this information along with an access token to the requestor.

The access token may be a unique string of characters and/or digits. In an embodiment, the access token may be encrypted by the authenticator application using a first encryption key associated with the authenticator application. The requestor may decrypt the access token with the first encryption key. The requestor may encrypt the access token with a second encryption key associated with a reader application. The requestor then sends the query to the location identified by the authenticator application and includes the access token (optionally encrypted, for example encrypted with the second encryption key). The reader application associated with the identified data store receives the query, confirms the validity of the access token, if the access token is valid, performs the access request, and returns data to the requestor.

In an embodiment, the reader application may enforce a time-to-live value associated with the access token. For example, the access token may build-in a time-to-live value. For example, an expiration date and time may be stored with the access token in the access token data store. In an embodiment, the reader application may enforce a one-time use restriction on the access token. In an embodiment, the reader application may enforce a pre-defined number of uses restriction, for example 5 uses, 10 uses, 15 uses, or some other predefined number of uses. In an embodiment, the authenticator application stores the access token in an access token data store accessible to it and to the reader application, and the reader application checks validity of an access token received from the requestor by attempting to look the access token up in the access token data store. In an embodiment, the access token is stored with a counter in the access token data store set to a maximum number of uses, and the reader application may decrement this count on each use. When the counter reaches a value of 1 or a value of 0, the reader application may delete the access token from the access token data store, thereby enforcing the one-time use or the pre-defined number of uses restriction. In an embodiment, the reader application may be provided in the form of microcontract instructions embedded in the mirrored data store, for example, in an embodiment where the mirrored data store is implemented in the form of a distributed ledger.

At both the authenticator application and the reader application the access request transaction is recorded. This could involve adding a first block created by the authenticator application to the audit distributed ledger and adding a second block created by the reader application to the audit distributed ledger. Alternatively, there may be a way to aggregate an in-progress record of the access request transaction so as to capture everything in one block. The information recorded in the block(s) on the audit distributed ledger can include the artifacts such as the query, the credential of the requestor presented for authentication, the access token, and possibly metadata about the result of the query (statistics—how many records were returned, what time did the transaction occur, etc.). The system periodically updates the mirrored data store to keep it reasonably reflective of and current with the data content stored in the actual distributed ledger. The audit distributed ledger can be reviewed to establish that only authorized parties have been able to access the data stored in the mirrored data store.

In an embodiment, the authenticator application authenticates the requestor, determines the requestor's privileges, and confirms the query does not exceed the requestor's privileges, while the reader application confirms the access token presented by the requestor is valid. In another embodiment, the reader application may simply authenticate the requestor and provide an address of the data store or the reader application. When the requestor sends the query to the reader application, the reader application evaluates the privileges of the requestor and determines that the requested information does not exceed the determined privileges of the requestor before reading and returning requested data. In another embodiment, the mirrored data store may comprise a plurality of mirrored data stores that partition the data among them, whereby to accelerate access of queries to the data stores. In an embodiment, a separate executing instance of the reader application may be associated with each different mirrored data store, and the authenticator application determines which instance of the reader application is associated with the requested data and returns the address of that instance of the reader application to the requestor. In an embodiment having multiple different mirrored data stores, each different mirrored data store may be associated with a corresponding different audit distributed ledger that is used to record and keep track of how recently its data was mirrored or updated against the distributed ledger. This audit distributed ledger can include, in addition to dates and times of updates, records of consistency confirmation checks.

Turning now to FIG. 1A, a system 100 is described. In an embodiment, the system 100 comprises a plurality of data creators 102 that communicate via a network 104 to a first data store 106 to store the data they create in a distributed ledger 108 in the first data store 106. The distributed ledger 108 comprises a plurality of blocks 110 that are arranged in an ordered sequence or in a chain of blocks. The first block 110 may have a special structure (e.g., may not comprise a hash of a previous block because there is no previous block—it is itself the first block in the sequence) and may be referred to as a genesis block, a root block, a start block, or an initial block. The other blocks in the distributed ledger 108 each have the same structure and comprise a hash value calculated over the previous block, a nonce value, a data content, and a hash value calculated over the hash of the previous block, over the nonce value, and over the data content. The nonce value may be selected to assure that the hash over the block satisfies a criterion, such as that the hash over the block has its four most significant digits all zeroes.

The first data store 106 and/or an application executing on a computer that manages the data store 106 may receive data from the data creators 102, build a new block, incorporate the data content received from the data creators 102 into the new block, and store the new block in the distributed ledger 108. In an embodiment, the data creators 102 may be communication network nodes, computers, or applications executing on computers. Computers are described further hereinafter. The network 104 comprises one or more public communication networks, one or more private communication networks, or a combination thereof.

The data created by the data creators 102 and stored in the data content portions of the blocks 110 may comprise information about telecommunication events, billable telecommunication events, banking transactions, medical event information (e.g., diagnostic events, treatment events, imaging events), electronic commerce transactions, and other data. The data stored in the data content portions of the blocks 110 may comprise a date and time associated with the data. The data stored in the data content portions of the blocks 110 may comprise an identity of a user equipment (UE) (e.g., a smart phone, a laptop computer, a notebook computer, a tablet computer, a personal digital assistant (PDA), a wearable computer, an Internet of things (IoT) device), an identity of a customer account, an identity of a subscription account, an identity of a bank account, or an identity of a person. The data store 106 or an application executing on a computer that manages the first data store 106 may authenticate that the data creators 102 are authorized to provide data content to be encapsulated in blocks added to the distributed ledger 108 before creating new blocks and adding them to the distributed ledger 108.

The system 100 further comprises a second data store 116. The second data store 116 stores the data content stored in the blocks 110 of the distributed ledger 108 as a mirrored data store 118 comprising a plurality of data content entries 120. A method executed by either the second data store 116 or by the first data store 106 operates to maintain the data content entries 120 consistent with the corresponding data content of the blocks 110 in the distributed ledger 108. The mirrored data store 118 may be implemented in any known data structure. The mirrored data store 118 may be implemented as a table of entries. The mirrored data store 118 may be implemented as a relational database. The mirrored data store 118 may be implemented as a flat file. The mirrored data store 118 may be implemented as a distributed ledger. The data content 120 are copies of the data content stored in the blocks 110 of the distributed ledger 108 and hence may comprise information about telecommunication events, billable telecommunication events, banking transactions, medical event information (e.g., diagnostic events, treatment events, imaging events), electronic commerce transactions, and other data. The data content 120 may comprise a date and time associated with the data. The data content 120 may comprise an identity of a user equipment (UE) (e.g., a smart phone, a laptop computer, a notebook computer, a tablet computer, a personal digital assistant (PDA), a wearable computer, an Internet of things (IoT) device), an identity of a customer account, an identity of a subscription account, an identity of a bank account, or an identity of a person. In an embodiment, the data content 120 may further comprise information about when the data content 120 was copied from the distributed ledger 108 and/or information about the synchronization process by which the data content 120 has been maintained in the mirrored data store 118.

The process of maintaining the data content entries 120 consistent with the corresponding data content of the blocks 110 may be referred to as synchronizing the mirrored data store 118 with the distributed ledger 108. This synchronizing may be performed by a synchronization application or synchronization process executing on a computer system. The mirrored data store 118 may be synchronized with the distributed ledger 108 periodically, for example every minute, every 5 minutes, every 15 minutes, every hour, every 2 hours, every 4 hours, every 6 hours, every 12 hours, every day, every week, or some other periodic interval. The mirrored data store 118 may be synchronized with the distributed ledger 108 on certain events, for example on the event of a data user 130 requesting data, on the event of a predefined number of data users 130 having requested data, on the event of a new block 110 being added to the distributed ledger 108, on the event of a predefined number of new blocks 110 being added to the distributed ledger 108.

In an embodiment, the synchronization process generates records of its activities whereby the synchronizations are recorded so they can be audited later. These synchronization records 124 may be stored in a synchronization records distributed ledger 122 that is stored with in the second data store 116 or in a separate data store. These synchronization records 124 may record the date and time of a synchronization. These synchronization records 124 may record the results of a consistency check that is performed during the synchronization process. The synchronization records 124 may comprise a sequence of blocks comprising a hash value of the previous block, a nonce, the information associated with the synchronization process (e.g., a data content portion of the block), and a hash over the hash of the previous block, over the nonce, and over the information associated with the synchronization process. In an embodiment, the synchronization records 124 may be stored in a different data store such as a table, a relational database, a flat file, or in another data structure other than a distributed ledger. The dotted line directed from the blocks 110 in the distributed ledger 108 to the data content 120 in the mirrored data store 118 refers to this synchronization activity. In an embodiment, records of synchronization may be included in the data content 120 in the mirrored data store 118 themselves. For example, each data content 120 may indicate when it was copied from the content field of the associated block of the distributed ledger 108.

The system 100 further comprises a first computer 132 that executes an authenticator application 134 and a second computer 136 that executes a reader application 138. In some contexts the reader application 138 may be referred to as a data store reader application. In an embodiment, the authenticator application 134 and the reader application 138 may execute on a same computer. It is noted, however, that executing the authenticator application 134 and the reader application 138 on different computers may promote additional security of the system 100. The authenticator application 134 receives requests from data users 130 for data stored in the distributed ledger 108. The data users 130 may be computers or applications executing on computers. It is noted that the system 100 may be said to hide the architectural separation of the system 100 into a distributed ledger 108 written to by data creators 102 and a mirrored data store 118 that is read from by data users 130 from both the data creators 102 and the data users 130. The system 100 simply provides application programming interfaces (APIs) that data creators 102 and data users 130 employ to interact with the system 100. This architectural separation promotes efficiency and speed of access of the system 100 but also promotes security of the baseline data which is stored in the distributed ledger 108.

The authenticator application 134 may first authenticate the data user 130 by comparing an identity provided in the request for data against a list of users. The authenticator application 134 may do an authentication process based on a user identity and a password carried in the request. If the data user 130 making a request for data is authenticated, in an embodiment, the authenticator application 134 may determine an access privilege associated with the authenticated user.

The authenticator application 134 may then determine an access privilege required to access the data the data user 130 is requesting to read. If the data user 130 does not have sufficient access privilege, the request is denied by the authenticator application 134. The access privilege associated with the data content 120 may be stored in the data content 120 itself, along with the data copied from the content field of the associated block 110 in the distributed ledger 108. In an embodiment, the synchronization process may determine the access privilege associated with the data content 120 during synchronization and add this to the data content 120. Alternatively, the data creators 102 may determine access privilege associated with the data that they request be stored in the content field of the block 110 in the distributed ledger 108 at the time of initial creation of the block 110.

If the data user 130 has sufficient access privilege, the authenticator application 134 determines a universal resource locator (URL) that the data user 130 can use to request the data from the reader application 138. The URL may reference the reader application 138 and/or may reference the second data store 116 or the mirrored data store 118. The authenticator application 134 returns the URL to the data user 130.

In an embodiment, the authenticator application 134 further creates an access token that is returned to the data user 130 and stores this in a third data store 140 or transmits the token to the reader application 138. The data user 130 sends this access token to the reader application 138 along with its request for data. The access token may be presented as a demonstration or proof of having successfully completed authentication via the authenticator application 134, for example presented to the reader application 138 in a request for data. The access token may comprise a unique digit string and/or a unique digit and character string. In an embodiment, the access token may be encrypted by the authenticator application 134, and the authenticator application 134 returns the encrypted access token to the data user 130. The access token may have a build-in time-to-live value such that the token remains valid for a predefined period of time, for example for 5 seconds, 10 seconds, 15 seconds, 30 seconds, 1 minute, 5 minutes, 10 minutes, 15 minutes, an hour, or some other period of time. The reader application 138 may enforce the time-to-live aspect of the access token, for example rejecting a request for data from the data user 130 without attempting to validate the access token simply because its time-to-live element is expired. In an embodiment, the access token may be a one-time use access token, and the reader application 138 may remove the access token from the third data store 140. Alternatively, the access token may allow multiple accesses. Alternatively, the access token may allow a limited plurality of accesses, for example 3 accesses, 5 accesses, 10 accesses, 15 accesses, 20 accesses. The reader application 138 may decrement a count of accesses stored with the access token in the third data store 140, and when the count is 1 or 0, the reader application 138 may remove the access token from the third data store 140.

The authenticator application 134 captures records or reports of its handling of data requests from the data users 130 and stores these, for example in the third data store 140. In some contexts the third data store 140 may be referred to as a transaction data store. In an embodiment, the transaction data store may store access tokens in addition to transaction records. The records identify data users 130, authentication transactions, authorization transactions, replies, and other information. These records of handling data requests may be referred to as transaction records, and the third data store 140 may be referred to as a transaction records data store in some contexts.

The data users 130 may send their request for data to the URL returned from the authenticator application 134 and to the reader application 138. The request can identify the information desired, for example by providing an identity of a UE, an identity of a subscription account, an identity of a bank account, an identity of a customer account, or another identity. The request can identify the information desired by providing a search string. The request may comprise an access token. For example, the data user 130 may send the encrypted access token received from the authenticator application 134 in the request for data it sends to the reader application 138. Alternatively, the data user 130 may decrypt the encrypted access token using a first encryption key associated with the reader application 138, encrypt the access token with a second encryption key, and send the access token encrypted with the second encryption key to the reader application 138.

In an embodiment, the reader application 138 checks an access token in the request received from the data user 130 against a list or table of access tokens stored in the third data store 140 or against a list of access tokens the reader application 138 has received from the authenticator application 134. If no access token matching the proffered access token is found, the reader application 138 rejects the request for information. In an embodiment, the access token embeds a time-to-live element, and the reader application 138 verifies that the time-to-live is not expired before searching for a match on the remainder of the access token in the third data store 140. It the access token is expired, the reader application 138 rejects the request for information. In an embodiment, the reader application 138 is not configured to check for an access token in the request from the data user 138.

The reader application 138 may use a reference (e.g., an identity or a search string as indicated above) to the requested information to search the data content 120 to find the desired information. If the reader application 138 finds the desired information, it sends the information to the data user 130. In an embodiment, the reader application 138 may obtain information about the latest synchronization record 124 (e.g., a last synchronization date and time) and return this synchronization information and/or other synchronization information along with the requested data content 120 to the data user 130. The reader application 138 may generate a report on all of its activities relative to the request from the data user 130 and store this in the third data store 140 in the transaction data store.

As can be appreciated, requests from data users 130 to read the data content 120 stored in the mirrored data store 118 do not interfere with requests from data creators 102 to add data to the distributed ledger 108, because they are directed to different data structures (the second data store 116 versus the first data store 106). This can reduce or eliminate bottlenecks caused by competing attempts to write to the same data store that is attempted to be read from. Additionally, this can provide some additional security to the source data that is stored in the first data store 106. The data users 130 may be prevented from directly accessing the source data—the distributed ledger 108—and therefore prevented from possibly corrupting the source data.

In an embodiment, audit systems 142 may access the first data store 106 to audit the distributed ledger 108 and verify that it has not been corrupted. The audit systems 142 may be computers or applications executing on computer systems. In an embodiment, the audit may be performed by transiting the distributed ledger 110 from the first block (e.g., a genesis block or a start block) to the last block, calculating a hash of each block to verify that it matches the block actually stored in the block. Alternatively, the audit may be performed by transiting the distributed ledger 110 from the last block backwards to the first block, calculating a hash of each block to verify that the hash matches what is stored in that block. In an embodiment, an audit may proceed in a different fashion. One of the audit systems 142 may access the second data store 116 to audit the synchronization records distributed ledger 122. In this case, the audit system 142 may first check the data content of the synchronization records 124 on the assumption that the synchronization records distributed ledger 122 has not been altered, focusing on the timeliness and correctness of the synchronization processes. After the quality and rigor of the synchronization records have been verified, the audit system 142 may further audit the integrity of the synchronization record distributed ledger 122 by transiting it from front to back or from back to front validating the hashes of each block as it transits the distributed ledger 122.

Figure 1B:
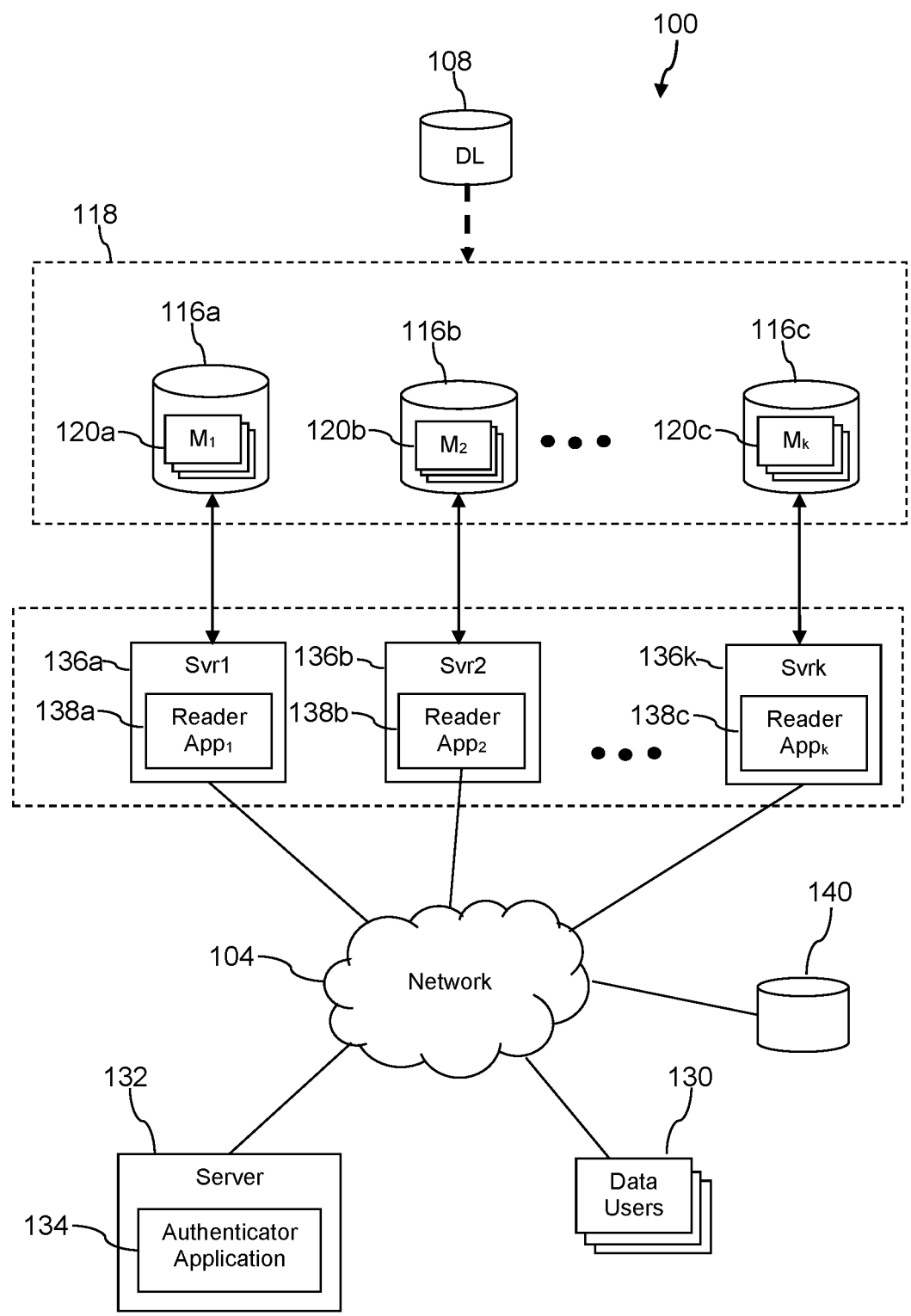
FIG. 1B is a block diagram of a system according to an embodiment of the disclosure.

Turning now to FIG. 1B, an alternative embodiment of the system 100 is described. Some of the components of the system 100 remain unchanged in FIG. 1B, for example the distributed ledger 108 and the data creators 102. In the embodiment of FIG. 1B, the mirrored data store 118 is partitioned into a plurality of data stores 116, for example a first mirrored data store 116a, a second mirrored data store 116b, and a third mirrored data store 116c. It will be appreciated that the mirrored data store 118 may be partitioned into any number of data stores 116. In an embodiment, a first reader application 138a executes on a third computer 136a, a second reader application 138b executes on a fourth computer 136b, and a third reader application 138c executes on a fifth computer 136c. It is understood that any number of reader applications 138 may be instantiated on computers 136. In an embodiment, a two or more reader applications 138 may execute on the same computer 136. In some contexts, the reader applications 138a, 138b, 138c may be referred to as different instances of the reader application 138.

In an embodiment, each instance of the reader application 138 may read from a single one of the data stores 116. In an embodiment, two or more instances of the reader application 138 may read from the same one of the data stores 116. In an embodiment, at least some of instances of the reader application 138 read from two or more of the data stores 116. In an embodiment, the data store reader application 138 executes as a plurality of instances of the data store reader application 138 (e.g., 138a, 138b, 138c). In an embodiment, the number of instances of the data store reader application 138 that execute is equal to the number of the data partitions of the mirrored data store. In an embodiment, the number of instances of the data store reader application 138 that execute is difference from the number of the data partitions of the mirrored data store. In an embodiment, each of the different instances of the data store reader application 138 executes on a different computer system. In an embodiment, at least two of the different instances of the data store reader application 138 execute on the same computer system.

By partitioning the data content 120 to store a first set of data content 120a in data store 116a, a second set of data content 120b in data store 116b, and a third set of data content 120c in data store 116c, the speed of access to read the data content 120 may be increased. When the authentication application 134 authenticates a data user 130 and returns a URL to the data user 130, the URL can designate the appropriate one of the computers 136a, 136b, 136c and/or reader application 138a, 138b, 138c. The data user 130 then directs its data request to the appropriate computer 136a, 136b, 136c or reader application 138a, 138b, 138c.

In an embodiment, the authentication application 134 may handle the request from the data user 130 in one atomic transaction. Said in other words, the data user 130 may request the data, the authentication application 134 may authenticate the data user 130, the authentication application 134 may determine access privileges of the data user 130, the authentication application 134 may determine the access privilege level needed to access the requested data, the authentication application 134 may determine that the access privilege of the data user 130 is equal to or greater than the access privilege level needed to access the requested data, the authentication application 134 may identify which computer 136a, 136b, 136c and/or which reader application 138a, 138b, 138c can provide access to the requested data, the authentication application 134 may request the data from the appropriate computer 136a, 136b, 136c and/or reader application 138a, 138b, 138c, the authentication application 134 may receive the requested data, and the authentication application 134 may return the requested data to the data user 130.

In an embodiment, there is a transaction distributed ledger associated with each of the mirrored data stores 116. For example, a first transaction distributed ledger associated with the first mirrored data store 116a, a second transaction distributed ledger associated with the second mirrored data store 116b, and a third transaction distributed ledger associated with the third mirrored data store 116c. As the authentication application 134 and the reader applications 138a, 138b, 138c complete transactions in the mirrored data stores 116a, 116b, 116c they create and add blocks onto these distributed ledgers recording the transactions.

Figure 2A:
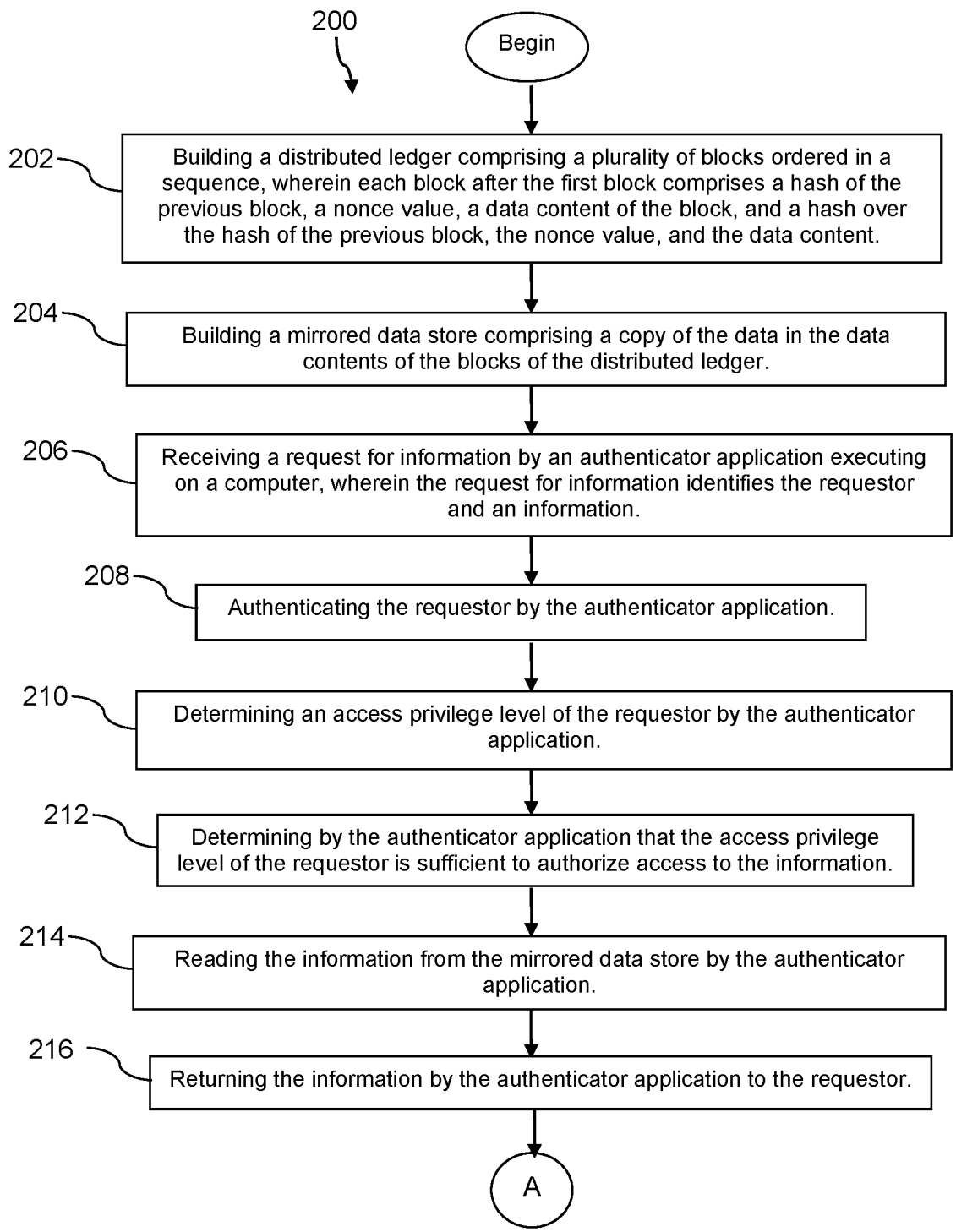
FIG. 2A and FIG. 2B are a flow chart of a method according to an embodiment of the disclosure.
Figure 2B:
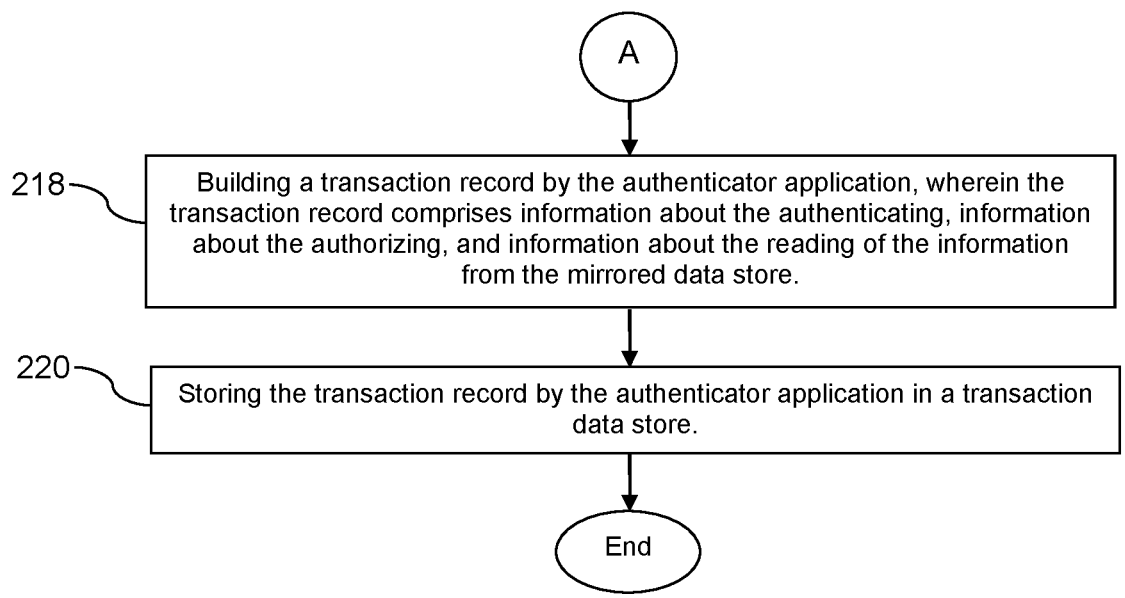

Turning now to FIG. 2A and FIG. 2B, a method 200 is described. In an embodiment, the method 200 comprises a method of providing read access to information stored in a distributed ledger. At block 202, the method 200 comprises building a distributed ledger comprising a plurality of blocks ordered in a sequence, wherein each block after the first block comprises a hash of the previous block, a nonce value, a data content of the block, and a hash over the hash of the previous block, the nonce value, and the data content.

At block 204, the method 200 comprises building a mirrored data store comprising a copy of the data in the data contents of the blocks of the distributed ledger. In an embodiment, the mirrored data store comprises an access privilege level associated with each of the copies of the data. In an embodiment, the access privilege level of each of the copies of the data is determined by a synchronization application that synchronizes the copies of data in the mirrored data store with the data contents of the blocks of the distributed ledger. At block 206, the method 200 comprises receiving a request for information by an authenticator application executing on a computer, wherein the request for information identifies the requestor and an information.

At block 208, the method 200 comprises authenticating the requestor by the authenticator application. At block 210, the method 200 comprises determining an access privilege level of the requestor by the authenticator application. In an embodiment, determining that the access privilege level of the requestor is sufficient to authorize access to the information comprises the authenticator application reading the access privilege level in the mirrored data store and comparing it to the access privilege level of the requestor.

At block 212, the method 200 comprises determining by the authenticator application that the access privilege level of the requestor is sufficient to authorize access to the information. At block 214, the method 200 comprises reading the information from the mirrored data store by the authenticator application. In an embodiment, the authenticator application reads the information from the mirrored data store by invoking a reader application that reads the information from the mirrored data store and returns the information to the authenticator application.

At block 216, the method 200 comprises returning the information by the authenticator application to the requestor. At block 218, the method 200 comprises building a transaction record by the authenticator application, wherein the transaction record comprises information about the authenticating, information about the authorizing, and information about the reading of the information from the mirrored data store. At block 220, the method 200 comprises storing the transaction record by the authenticator application in a transaction data store. In an embodiment, the method 200 further comprises reading transaction records from the transaction data store by an audit system and determining by the audit system that the access privilege level associated with each of the copies of the data is enforced.

Figure 3:
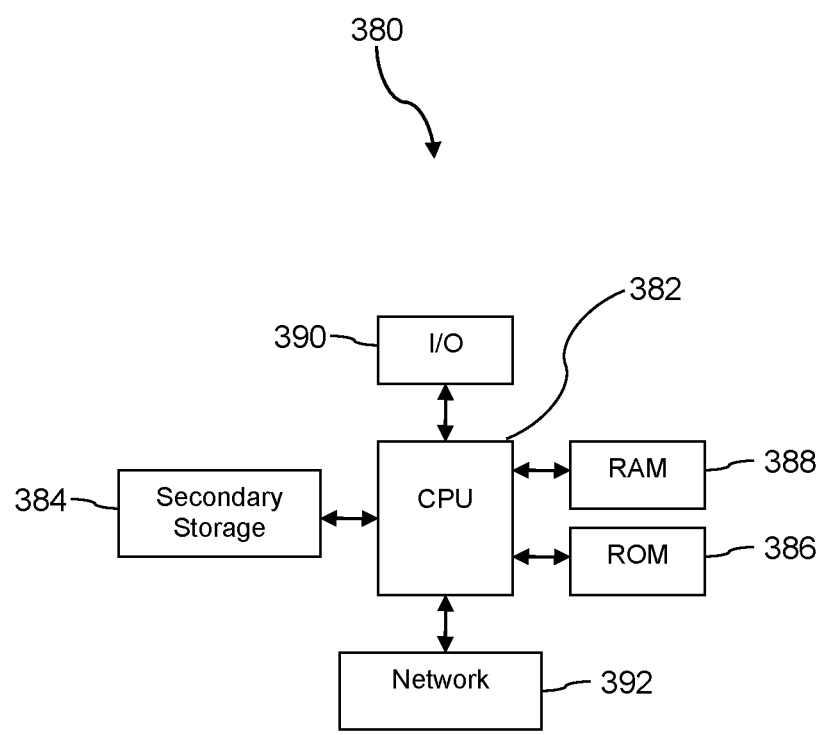
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A distributed ledger data store system that separates writing to the distributed ledger from reading the data stored in the distributed ledger, comprising:

a distributed ledger comprising a plurality of blocks ordered in a sequence;

a mirrored data store comprising a copy of data content of the blocks of the distributed ledger;

a transaction data store comprising records of access transactions;

an authenticator application stored in a non-transitory memory that, when executed on a computer, receives a request for information stored in the mirrored data store, wherein the request comprises an identity of a requester, authenticates the identity of the requester, in response to authenticating the requester, generates an access token, stores the access token in an access token data store, returns the access token and a universal resource locator (URL) associated to the mirrored data store to the requester, and stores a record of the authentication of the requestor in the transaction data store;

a data store reader application stored in a non-transitory memory that, when executed on a computer, receives a request to read data from the mirrored data store from the requester, wherein the request comprises an access token and an identification of data to be read, determines whether the access token matches an access token stored in the access token data store, and in response to a determination that the access token does not match any access token stored in the access token database, rejects the request to read data identified by the request from the mirrored data store.

2. The system of claim 1, wherein the data content of the blocks of the distributed ledger comprise data about telecommunication events.

3. The system of claim 2, wherein the data content of some of the blocks of the distributed ledger comprise data about billable telecommunication events.

4. The system of claim 1, wherein the data content of the blocks of the distributed ledger comprise data about banking transactions.

5. The system of claim 1, wherein the data content of the blocks of the distributed ledger comprise data about medical event information.

6. The system of claim 1, wherein the data content of the blocks of the distributed ledger comprise data about electronic commerce transactions.

7. The system of claim 1, wherein the mirrored data store is periodically synchronized with the data contents of the blocks of the distributed ledger.

8. The system of claim 1, wherein the access token comprises a time-to-live value, and wherein the data store reader application further determines that the time-to-live value of the access token has not expired before determining whether the access token matches an access token stored in the access token data store.

9. A method of providing read access to information stored in a distributed ledger, comprising:

receiving, by an authenticator application executing on a computer, a request for information stored in a mirrored data store, wherein the mirrored data store comprises copy of data contents of blocks of a distributed ledger, wherein the mirrored data store is partitioned into a plurality of data partitions, and wherein the request comprises an identity of a requester;

authenticating, by the authenticator application, the identity of the requester;

identifying, by the authenticator application, a universal resource locator (URL) associated with a first data partition of the plurality of data partitions of the mirrored data store where the requested information is stored, wherein the URL designates a first instance of a data store reader application;

returning, by the authenticator application, the URL to the requester;

storing, by the authenticator application, a record of the authentication of the requestor in a transaction data store associated with the first data partition;

receiving, by the first instance of the data store reader application executing on a computer, a request from the requestor to read the information from the first data portion;

reading, by the first instance of the data store reader application, data identified by the request from the first data partition;

returning, by the first instance of the data store reader application, the information read from the first data partition to the requester; and storing, by the first instance of the data store reader application, a record of the fulfilled read request in the transaction data store associated with the first data partition.

10. The method of claim 9, wherein the data store reader application executes as a plurality of instances of the data store reader application, and wherein the plurality of instances of the data store reader application includes the first instance of the data store reader application.

11. The method of claim 10, wherein the number of instances of the data store reader application that execute is equal to the number of the data partitions of the mirrored data store.

12. The method of claim 10, wherein the number of instances of the data store reader application that execute is difference from the number of the data partitions of the mirrored data store.

13. The method of claim 10, wherein each of the different instances of the data store reader application executes on a different computer system.

14. The method of claim 10, wherein at least two of the different instances of the data store reader application execute on the same computer system.

15. The method of claim 9, further comprising:

receiving, by the authenticator application, a second request for information stored in the mirrored data store, wherein the second request comprises an identity of a second requester;

authenticating, by the authenticator application, the identity of the second requester;

identifying, by the authenticator application, a second URL associated with a second data partition of the plurality of data partitions of the mirrored data store where the second requested information is stored, wherein the second URL designates a second instance of the data store reader application;

returning, by the authenticator application, the second URL to the second requester;

storing, by the authenticator application, a record of the authentication of the second requestor in the transaction data store associated with the second data partition;

receiving, by the second instance of the data store reader application, a second request from the second requestor to read the information from the second data portion;

reading, by the second instance of the data store reader application, data identified by the second request from the second data partition;

returning, by the second instance of the data store reader application, the information read from the second data partition to the second requester; and storing, by the second instance of the data store reader application, a record of the fulfilled read request in the transaction data store associated with the second data partition.

16. A distributed ledger data store system that separates writing to the distributed ledger from reading the data stored in the distributed ledger, comprising:

a distributed ledger comprising a plurality of blocks ordered in a sequence;

a mirrored data store comprising a copy of data contents of the blocks of the distributed ledger, wherein the mirrored data store is partitioned into a plurality of data partitions;

a plurality of transaction data stores comprising records of access transactions, each one of the transaction data stores storing records of access transactions associated with a corresponding one of the data partitions;

an authenticator application stored in a non-transitory memory that, when executed on a computer, receives a plurality of requests for information stored in the mirrored data store, receives a first request for information stored in the mirrored data store, wherein the first request comprises an identity of a first requester, authenticates the identity of the first requester, identifies a first universal resource locator (URL) associated with a first data of the plurality data partitions of the mirrored data store where the first requested information is stored, returns the URL to the first requester, stores a record of the authentication of the first requestor in the transaction data store associated with the first data partition, receives a second request for information stored in the mirrored data store, wherein the second request comprises an identity of a second requester, authenticates the identity of the second requester, identifies a second URL associated with a second data of the plurality data partitions of the mirrored data store where the second requested information is stored, returns the second URL to the second requester, and stores a record of the authentication of the second requestor in the transaction data store associated with the second data partition;

a first instance of a data store reader application stored in a non-transitory memory that, when executed on a computer, receives a first request from the first requestor to read the information from the first data portion, reads data identified by the first request from the first data partition, returns the information read from the first data partition to the first requester, and stores a record of the fulfilled read request in the transaction data store associated with the first data partition; and a second instance of the data store reader application stored in a non-transitory memory that, when executed on a computer receives a second request from the second requestor to read the information from the second data, reads data identified by the second request from the second data partition, returns the information read from the second data partition to the second requester, and stores a record of the fulfilled read request in the transaction data store associated with the second data partition.

17. The system of claim 16, wherein the data store reader application executes as a plurality of instances of the data store reader application, and wherein the number of instances of the data store reader application that execute is equal to the number of the data partitions of the mirrored data store.

18. The system of claim 16, wherein the data store reader application executes as a plurality of instances of the data store reader application, and wherein the number of instances of the data store reader application that execute is difference from the number of the data partitions of the mirrored data store.

19. The system of claim 16, wherein the first instance of the data store reader application and the second instance of the data store reader application execute on different computer systems.

20. The system of claim 16, wherein the first instance of the data store reader application and the second instance of the data store reader application execute on the same computer system.

* * * * *